United States Patent [19]
Williamson

[11] Patent Number: 5,498,473
[45] Date of Patent: Mar. 12, 1996

[54] POLYMERIC FILMS

[75] Inventor: David Williamson, Swindon, England

[73] Assignee: Courtaulds Films (Holdings) Limited, Somerset, England

[21] Appl. No.: 332,454

[22] Filed: Oct. 31, 1994

Related U.S. Application Data

[63] Continuation of Ser. No. 35,964, Mar. 23, 1993, abandoned.

[51] Int. Cl.$^6$ ............................. B32B 5/18; B32B 27/20
[52] U.S. Cl. ................................... 428/317.3; 428/317.9; 428/318.6; 428/318.8; 428/349; 428/354
[58] Field of Search ........................ 428/317.3, 317.7, 428/317.9, 318.6, 318.8, 349, 354

[56] References Cited

U.S. PATENT DOCUMENTS 5,091,236  2/1992  Keller et al. ............................. 428/213
5,151,317  9/1992  Bothe ..................................... 428/216

FOREIGN PATENT DOCUMENTS 0312226  4/1989  European Pat. Off. .
0435626  7/1991  European Pat. Off. .
3940173  6/1991  Germany .

*Primary Examiner*—Jenna L. Davis
*Attorney, Agent, or Firm*—Bacon & Thomas

[57] ABSTRACT

Biaxially oriented polymeric films consisting of a first layer of a propylene homopolymer having on one side thereof and coextensive therewith a second layer of a non-voided propylene homopolymer and on the other side thereof and coextensive therewith a third layer of a voided propylene homopolymer, the said second layer having a heat sealable layer thereon and coextensive therewith. Films of the invention have puncture resistance combined with good gloss.

20 Claims, No Drawings

POLYMERIC FILMS

This application is a Continuation of application Ser. No. 08/035,964, filed Mar. 23, 1993, now abandoned.

This invention concerns polymeric films and especially polypropylene films having puncture resistance combined with good gloss.

It has been proposed hitherto in Research Disclosure 226030A to impart puncture resistance to polymeric films by the inclusion of a layer consisting of a blend of polypropylene with a low density polyethylene. Although such layers impart some degree of puncture resistance, depending upon their relative thickness compared with that of the film itself, they have the disadvantage of reducing the gloss of the films.

According to the present invention there is provided a biaxially oriented polymeric film comprising a first layer of a propylene homopolymer having on one side thereof and coextensive therewith a second layer of a non-voided propylene homopolymer and on the other side thereof and coextensive therewith a third layer of a voided propylene homopolymer, the said second layer having a heat sealable layer thereon and coextensive therewith.

Films of the present invention have shown good puncture resistance combined with particularly good gloss when viewed from the side having the non-voided polypropylene layer next to the heat seal layer. In addition, films of the present invention can provide tamper evidence after sealing the other side of the films to a substrate, for example by the voided layer rupturing when such seals are peeled and thereby giving evidence of tampering with the seal.

The said first layer of propylene homopolymer generally serves as a core layer, i.e. it forms the central layer of the four specified layers of films of the present invention. It is usually too the thickest layer of such films.

The said first layer can be voided or non-voided, voiding for example being used to reduce the overall density of the films. However, voiding of this layer can affect the gloss of the heat seal layer thereon and it is therefore generally preferred that the degree of voiding of this layer be kept low whilst providing the films with reduced density through voiding. The first layer can contain up to 10 percent, e.g. about 5 percent, by weight of voiding agent but lower amounts, e.g. up to 2 percent or more preferably about 1 percent, by weight are usually required if the gloss of the heat seal layer on the said second layer is not to be significantly adversely affected.

Voiding of the said third, and where desired the first, layers can be effected using organic or inorganic voiding agents, for example polyamides, e.g. nylons, polyesters, e.g. polyethylene terephthalate or polybutylene terephthalate, or chalk. The use of voiding agents with polypropylene is well known in the art, as are the particle sizes of the voiding agent required to effect voiding.

Voiding of the third layer is preferably effected using from 5 to 15 percent by weight of voiding agent based on the weight of the third layer, it being preferred to use larger amounts than are necessary merely to induce voiding when it is required to impart the ability to show evidence of tampering of seals between the film and a substrate to which the film has been heat sealed. Tamper evidence can usually be provided by the third layer containing up to 25 percent by weight of voiding agent, especially chalk, and although 15 percent by weight or less of voiding agent can be used for the purpose, it is generally preferred to use at least 20 percent by weight of voiding agent, all such percentages being based on the weight of the third layer. Large amounts of voiding agent can, however, be undesirable as they can lead to excessive weakening of the films.

Any or all of the said first, second and third polypropylene layers can include a pigment. Such pigments are additional to any voiding agents which may be included in such layers to impart properties to the film resulting from voiding, the second layer being non-voided. Examples of pigments which can be used include titanium dioxide. The particle size of the pigment will usually be sub-micronic in order to avoid voiding of the layer in which it is present.

Although a pigment can be present in all three of the said first, second and third layers, it is generally preferred that at least the third of said layers should contain a pigment, but usually in an amount of not more than 10 percent by weight of the third layer. It is also preferred that the first of said layers should contain a pigment, and it is preferred to use not more than 20 percent by weight of the first layer. Although it is generally not preferred to include a pigment in the said second layer since such pigments often reduce the gloss of the heat seal layer on the said second layer, it is often necessary to do so to impart the desired degree of opacity to the films. The second layer can, therefore, contain up to 14 percent by weight of a non-voiding pigment based on the weight of the second layer, although lesser amounts are generally preferred.

The said second layer has a heat sealable layer coextensive therewith, for example formed from a copolymer containing units derived from propylene and at least one of ethylene and but-1-ene, or a linear low density polyethylene, e.g. propylene/ethylene or propylene/but-1-ene copolymers, or propylene/ethylene/but-1-ene terpolymers.

Films in accordance with the present invention will usually include one or more layers coextensive with the said third layer to provide the films with sealability. For example, the films can include a heat sealable layer, itself preferably coextensive with the said third layer, or they can include at least one coextensive layer, for example of a non-heat sealable polymer, to which can be applied a hot or cold sealable layer, for example a cold seal adhesive composition or polyvinylidene chloride. Examples of heat sealable layers which can be used include copolymers of propylene with at least one of ethylene and but-1-ene, i.e. propylene/ethylene and propylene/but-1-ene copolymers, and propylene/ethylene/but-1-ene terpolymers, or linear low density polyethylene. When sealable compositions are to be applied to the said third layer, they will usually be applied to a layer of polypropylene homopolymer coextensive with the said third layer.

The said third layer can furthermore be provided with one or more layers which impart other properties to the films. For example, a metallizable layer on the said third layer can form an outer surface of the films.

Films in accordance with the present invention can include one or more additives used in the art, for example to provide antiblock, antistatic or slip properties to the films.

Films in accordance with the present invention can be produced by known methods, and advantageously by coextrusion of the respective layers followed by biaxial stretching which is preferably effected sequentially.

Films in accordance with the present invention can be prepared of a variety of thicknesses, the individual layers also being of a variety of thicknesses. For example, the films can be from 30 to 60 μm thick, e.g. about 40 μm thick. The said first layer is preferably the thickest layer, for example from 20 to 40 μm thick, with the third layer usually being the second thickest layer, for example from 5 to 15 μm thick. The second layer can be up to 10 μm or more, but it is usually sufficient for the second layer to be about 5 μm thick in order to impart high gloss to the heat seal layer thereon.

The heat seal layer or layers will usually be not more than 2 μm thick, for example about 1 μm thick, in order to confer heat sealability. However, thicker heat seal layers can be used when it is desired to impart a particularly high degree of heat sealability.

The following Examples are given by way of illustration only. All parts are by weight unless stated otherwise.

EXAMPLE 1

A five-layer polymer web was produced by coextruding through a slot die a core layer of propylene homopolymer containing 2 percent by weight of titanium dioxide of mean particle size 0.8 μm with a layer of propylene homopolymer on one side and a layer of propylene homopolymer containing 5 percent by weight of titanium dioxide of mean particle size 0.8 μm and about 20 percent by weight of chalk having a mean particle size of about 3.5 μm, and outer layers of a propylene/ethylene (4 percent ethylene) copolymer on either side of the polypropylene homopolymer layers.

The five-layer web was then stretched 4.5 times in the direction of extrusion over heated rollers at 110° C. with different peripheral speeds, and 10 times in the transverse direction in a stenter oven at 156° C. The resulting five layer, biaxially oriented film was then subjected to corona discharge on the surface formed by the copolymer on the non-voided homopolymer layer, and the film was wound up. The film had a total thickness of 40 μm, the central, core layer containing titanium dioxide being non-voided and 23 μm thick, with the voided layer containing the chalk being 10 μm thick, and the non-voided, non-pigmented homopolymer layer being 5 μm thick. The two copolymer layers were each 1 μm thick.

The resulting film showed a gloss of 52 for the copolymer surface on the non-voided homopolymer compared with 5 for the opposite film surface. The film had an optical density of 0.52 and a density of 0.70 g/cm$^3$. Its puncture resistance was 0.52 using the 1 mm probe and 3.19 using the 3 mm probe.

EXAMPLE 2

A five-layer polymer web was produced by coextruding through a slot die a core layer of propylene homopolymer containing 5 percent by weight of titanium dioxide of mean particle size 0.8 μm and 5 percent by weight of calcium carbonate of mean particle size 3 μm with a layer of propylene homopolymer containing 10 percent by weight of titanium dioxide of mean particle size 0.8 μm on one side and a layer of propylene homopolymer containing 5 percent by weight of titanium dioxide of mean particle size 0.8 μm and 14 percent by weight of chalk having a mean particle size of about 3 μm, an outer layer of a propylene/ethylene (4 percent ethylene) copolymer on the polypropylene homopolymer layer not containing chalk, and an outer layer of a propylene/ethylene/butene terpolymer on the other side.

The five-layer web was then stretched 4.5 times in the direction of extrusion over heated rollers at 110° C. with different peripheral speeds, and 10 times in the transverse direction in a stenter oven at 156° C. The resulting five layer, biaxially oriented film was then subjected to corona discharge treatment on the surface formed by the propylene/ethylene copolymer layer, and the film was wound up. The film had a total thickness of 44 μm, the central, core layer containing titanium dioxide being voided and 28.5 μm thick, with the voided layer containing 14 percent of chalk being 8 μm thick, and the non-voided, pigmented hompolymer layer being 8 μm thick. The propylene/ethylene copolymer layer was 1 μm thick and the propylene/ethylene/butene terpolymer layer was 1.5 μm thick.

The resulting film showed a gloss of 30 for the copolymer surface on the non-voided hompolymer compared with 5 for the opposite film surface. The film had an optical density of 0.71 and a density of 0.69/cm$^3$. Its puncture resistance was 0.52 using 1 mm probe and 3.11 using the 3 mm probe.

EXAMPLE 3

A five-layer film was produced as described in Example 2 except that the core layer contained 7 percent by weight of calcium carbonate of mean particle size 1 μm instead of 5 percent by weight of mean particle size 3 μm.

The resulting film showed a gloss of 39 for the copolymer surface on the non-voided hompolymer compared with 5 for the opposite film surface. The film had an optical density of 0.75 and a density of 0.69/cm$^3$. Its puncture resistance was 0.49 using the 1 mm probe and 2.97 using the 3 mm probe.

EXAMPLE 4 (COMPARISON)

A three-layer polymer web was produced by coextruding through a slot die a core layer of propylene homopolymer containing 5 percent by weight of calcium carbonate of 3 μm mean particle size and 2 percent by weight of titanium dioxide having a mean particle size of 0.8 μm with an outer layer on each side of the core layer and consisting of a propylene/ethylene (4 percent ethylene) copolymer.

The web was then biaxially stretched to produce a three-layer film with an overall thickness of 43 μm, the core layer being 40 μm thick and the two outer layers each being 1.5 μm thick.

Both outer surfaces of this film had a gloss of 10, the film having an optical density of 0.56 and a density of 0.69 g/cm$^3$. Its puncture resistance was 0.43 using the 1 mm probe and 1.75 using the 3 mm probe.

The films of Examples 1, 2 and 3 showed a considerably higher gloss for one of their surfaces than that of either of the surfaces of the comparison film of Example 4. Furthermore, when the films of Examples 1, 2 and 3 were heat sealed to a polyethylene container to form a heat seal on the container, they gave evidence of tampering when peeled from the container as a result of the voided layer rupturing when peeling is effected. They also showed evidence of tampering when peeled apart after heat sealing to themselves.

I claim:

1. A biaxially oriented puncture resistant polymeric film for heat sealing onto a substrate comprising a first layer of a propylene homopolymer having on one side thereof and coextensive therewith a second layer of a non-voided propylene homopolymer and on the other side thereof and coextensive therewith a third layer of a voided propylene homopolymer, said third layer including 14%–25% by weight of chalk as a voiding agent; the said second layer having a heat sealable layer thereon and coextensive therewith whereby said film is capable of providing evidence of tampering when said film is peeled from said substrate after said film has been heat sealed thereto.

2. A film according to claim 1, wherein the said first layer is non-voided.

3. A film according to claim 1, wherein the said first layer is voided.

4. A film according to claim 1, wherein the said first layer includes a pigment.

5. A film according to claim 1, wherein the said second layer includes a pigment.

6. A film according to claim 1, wherein the said third layer includes a pigment in addition to a particulate material which induces the voiding.

7. A film according to claim 4, wherein the pigment in one or more of said layers comprises titanium dioxide.

8. A film according to claim 1, wherein the said third layer has at least one polymeric layer coextensive therewith.

9. A film according to claim 6, wherein the said at least one polymeric layer includes an outer heat sealable layer.

10. A film according to claim 1, wherein at least the heat sealable layer on the said second layer and any heat sealable layer on the said third layer comprises a copolymer containing units derived from propylene and from at least one of ethylene and but-1-ene, or a linear low density polyethylene.

11. A film according to claim 1, wherein at least one of the outer surfaces of the film has been treated to increase its surface energy.

12. A biaxially oriented polymeric film comprising a core layer of a non-voided propylene homopolymer containing a pigmentary amount of titanium dioxide, a first intermediate layer on one side of the core layer said intermediate layer being of a non-voided propylene homopolymer and a second intermediate layer on the other surface of the core layer, the second intermediate layer being of a voided propylene homopolymer containing from about 14%–25% by weight of chalk as a voiding agent and a pigmentary mount of titanium dioxide, the film furthermore having two outer heat sealable layers.

13. A film according to claim 12, wherein the second intermediate layer contains about 20% by weight of chalk as the voiding agent.

14. A film according to claim 12, wherein the second intermediate layer contains about 5% by weight of titanium dioxide pigment.

15. A film according to claim 12, wherein the core layer contains about 2% by weight of titanium dioxide pigment.

16. A biaxially oriented polymeric film comprising a core layer of a voided propylene homopolymer containing a pigmentary mount of titanium dioxide, a first intermediate layer on one side of the core layer said intermediate layer being of a non-voided propylene homopolymer containing a pigmentary mount of titanium dioxide, and a second intermediate layer on the other surface of the core layer, the second intermediate layer being of a voided propylene homopolymer containing from about:14%–25% by weight of chalk as a voiding agent and a pigmentary amount of titanium dioxide, the film furthermore having two outer heat sealable layers.

17. A film according to claim 16, wherein the first intermediate layer contains about 10% by weight of titanium dioxide pigment.

18. A film according to claim 16, wherein the second intermediate layer contains about 14% by weight of chalk as a voiding agent.

19. A film according to claim 16, wherein the second intermediate layer contains about 5% by weight of titanium dioxide pigment.

20. A film according to claim 16, wherein the core layer contains about 5% by weight of chalk as a voiding agent.

* * * * *